United States Patent
Liu et al.

(10) Patent No.: US 6,879,758 B2
(45) Date of Patent: Apr. 12, 2005

(54) MULTI-DEGREE-OF-FREEDOM OF PRECISION POSITIONING DEVICE USING SPRING-MOUNTED ELECTROMECHANICAL ACTUATORS

(75) Inventors: Yung-Tien Liu, Kaohsiung (TW); Rong-Fong Fung, Tashe Hsiang (TW); Jiunn-Chau Wang, Kaohsiung (TW)

(73) Assignee: National Kaohsiung First University of Science and Technology, Kaohsiung (TW)

( * ) Notice: Subject to any disclaimer, the term of this patent is extended or adjusted under 35 U.S.C. 154(b) by 115 days.

(21) Appl. No.: 10/463,624

(22) Filed: Jun. 16, 2003

(65) Prior Publication Data

US 2004/0252947 A1 Dec. 16, 2004

(51) Int. Cl.$^7$ .............................................. G02B 6/255
(52) U.S. Cl. .......................................... 385/52; 385/98
(58) Field of Search ............................. 385/45, 52, 60, 385/95–99

(56) References Cited

U.S. PATENT DOCUMENTS 5,530,782 A * 6/1996 Osaka et al. ................... 385/45
5,757,997 A * 5/1998 Birrell et al. .................. 385/60

* cited by examiner

*Primary Examiner*—Phan T. H. Palmer
(74) *Attorney, Agent, or Firm*—Dellett & Walters

(57) ABSTRACT

A multi-DOF of positioning device has a main base, a fixed base, a translational Y-axial element, a translational X-axial element, multiple spring-mounted electromechanical actuating units, an elevating device, a rotational angle-adjusting assembly and an optical fiber holder. The translational Y-axial element is moveably mounted on the fixed base along a first axis. The translational X-axial element is moveably mounted on the translational Y-axial element along a second axis. The elevating device is moveably mounted on the main base along a third axis. The spring-mounted electromechanical actuating units are used to translationally move the fixed base, the translational Y-axial element and the elevating device relative to the corresponding structure along one of the axes. The rotational angle-adjusting assembly is mounted on the translational X-axial element and having a capability of rotating relative to the first, the second and the third axes.

20 Claims, 12 Drawing Sheets

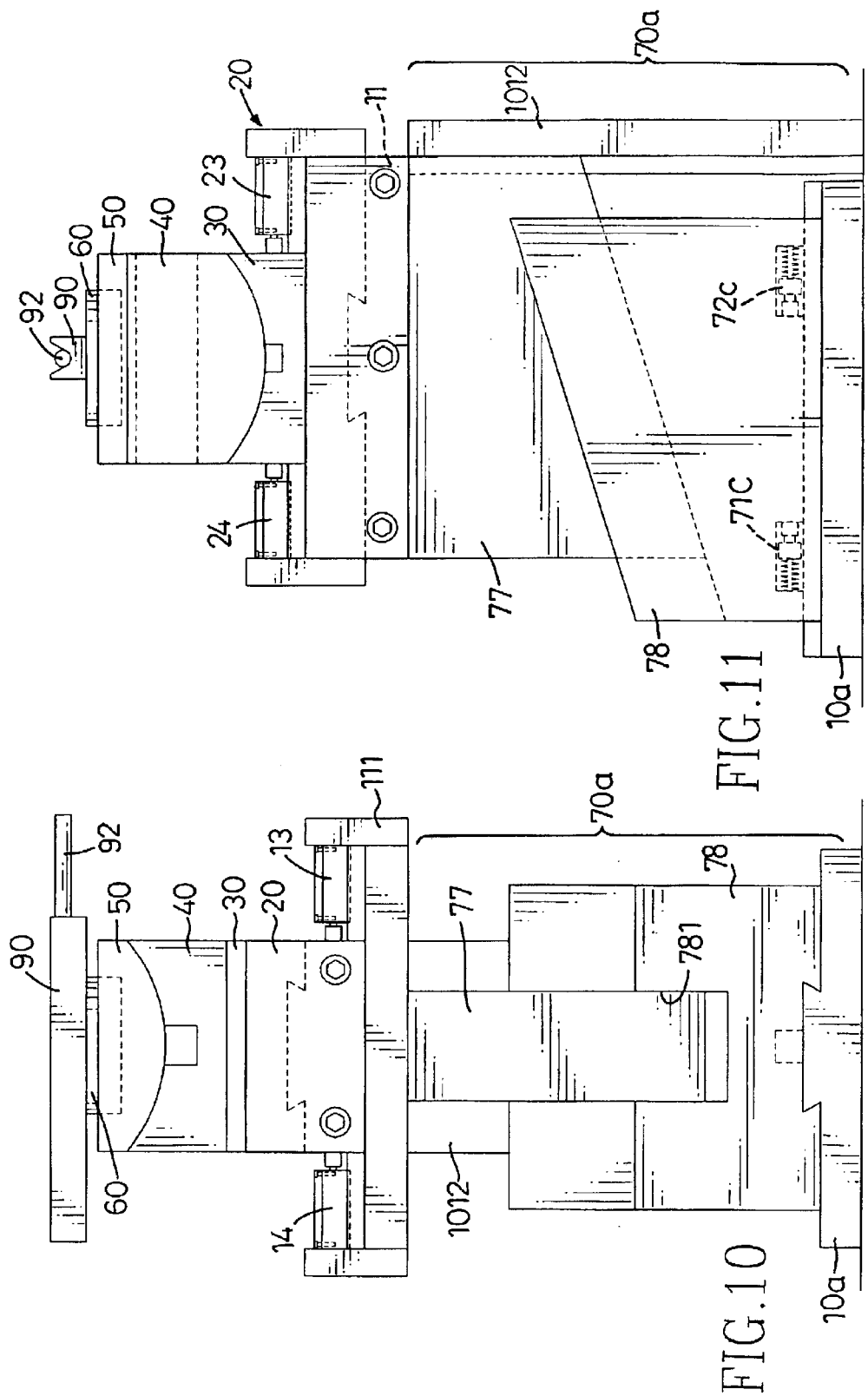

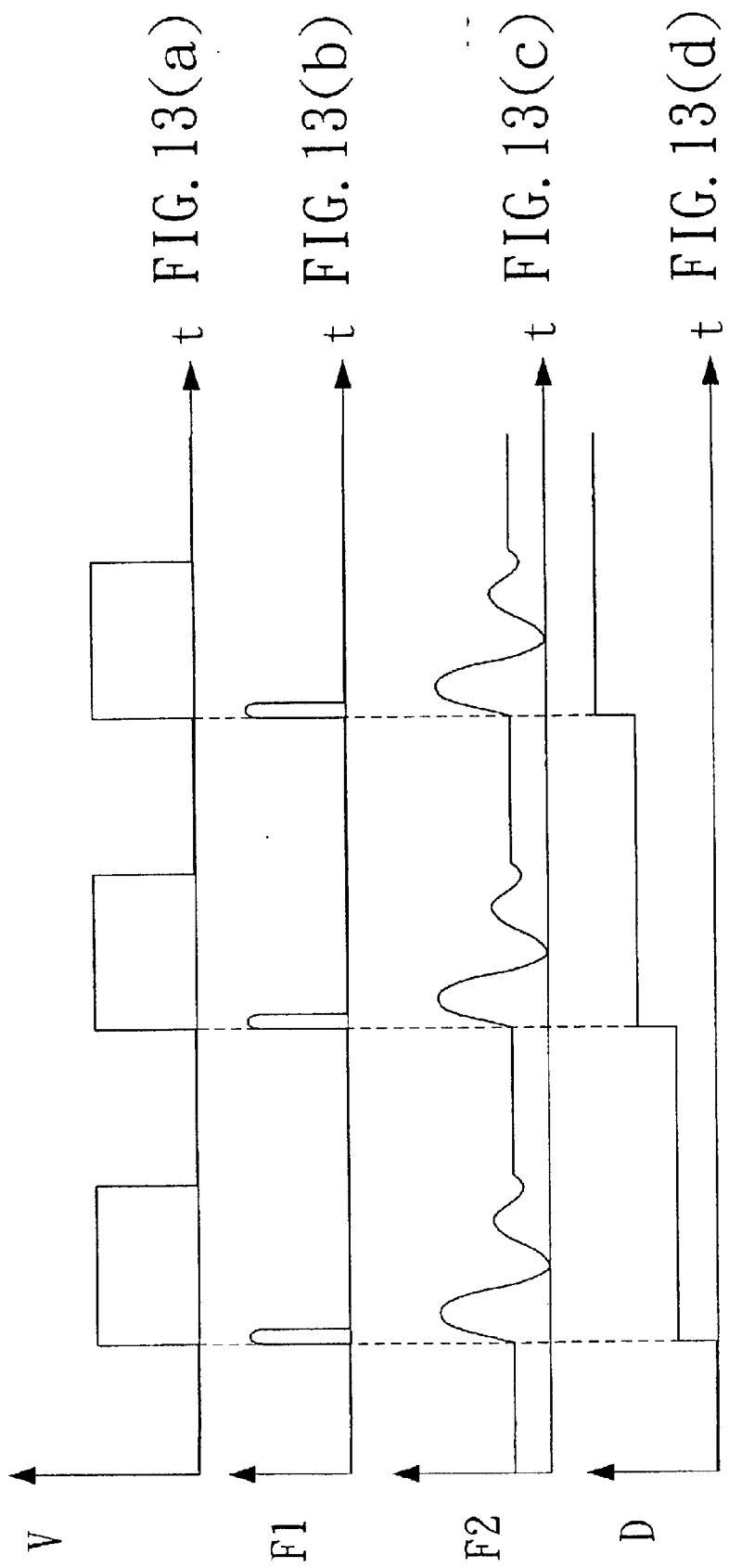

MULTI-DEGREE-OF-FREEDOM OF PRECISION POSITIONING DEVICE USING SPRING-MOUNTED ELECTROMECHANICAL ACTUATORS

BACKGROUND OF THE INVENTION

1. Field of the Invention

The present invention relates to a multi-DOF (degree-of-freedom) of positioning device using spring-mounted electromechanical actuators, and more particularly to the positioning device that can perform precise translational and rotational motions in three dimensions with micro/nano-meter positioning ability.

2. Description of Related Art

A conventional optic fiber alignment device uses a computerized motor and a gear assembly to control an alignment angle between two optic fibers. Each of the optic fibers has an alignment end, and a maximum acceptance angle, which is the radiated angle when lights transmit out of an alignment end for an optic fiber. The closer the two filament alignment ends are pointing at each other then the more portion of the radial angle is covered. The more portion of the radial angle is covered then the better the signal carried by lights passes through. In other words, a higher coupling efficiency has a potential to be achieved when an alignment angle can be determined within range of every hundred nano-meter. However, a clearance occurs in alignment ends between the two optic fibers when the gear assembly is used to determine the alignment angle almost every time. If repeatedly uses the computerized motor and gear assembly for determining the alignment angle between two alignment ends of any two optic fibers, a clearance keeps happening and blocks the efficiency of a signal transmitting from one optic fiber to another optic fiber. Therefore, the disadvantage is that using a computerized motor and gear assembly to determine an alignment angle between two optic fibers are not accurate enough in terms of every hundred nano-meter.

To overcome the shortcomings, the present invention tends to provide a positioning device with micro/nano-meter positioning ability in three dimensions to mitigate and obviate the aforementioned problems.

SUMMARY OF THE INVENTION

The primary objective of the present invention is to provide a multi-DOF of positioning device using spring-mounted electromechanical actuators for the applications such as the optic fibers alignment device, which commonly comprises both the functions of translational and rotational motions in three dimensions for adjusting two filaments of optic fibers with any direction and any angle through a delicate process.

To accomplish the foregoing objective, the multi-DOF (degree-of-freedom) of positioning device has a main base, a fixed base, a translational Y-axial element, a translational X-axial element, multiple spring-mounted electromechanical actuating units, an elevating device, a rotational angle-adjusting assembly and an optical fiber holder. The translational Y-axial element is moveably mounted on the fixed base along a first axis. The translational X-axial element is moveably mounted on the translational Y-axial element along a second axis perpendicular to the first axis. The elevating device is moveably mounted on the main base along a third axis perpendicular to the first and the second axes. The spring-mounted electromechanical actuating units are respectively mounted on the fixed base, the translational Y-axial element and the elevating device to move the fixed base, the translational Y-axial element and the elevating device relative to the corresponding structure along one of the axes. The rotational angle-adjusting assembly is mounted on the translational X-axial element and having a capability of rotating relative to the first, the second and the third axes. The optical fiber holder is attached to the rotational angle-adjusting assembly and is adapted to support an optic fiber to align with another optic fiber.

Other objectives, advantages and novel features of the invention will become more apparent from the following detailed description when taken in conjunction with the accompanying drawings.

BRIEF DESCRIPTION OF THE DRAWINGS

FIG. 10 is a front view of a third embodiment of a multi-DOF of positioning device in accordance with the present invention;

FIG. 11 is a side view of the multi-DOF of positioning device in FIG. 10;

FIG. 13($a$) is a diagram of pulse voltage (V) waveform verse time (t);

FIG. 13(b) is a diagram of a forward impulsive force (F1) verse time (t);

FIG. 13(c) is a diagram of a vibrated backward force (F2) verse time (t); and

FIG. 13(d) is a diagram of step-like displacement (D) verse time (t).

DETAILED DESCRIPTION OF THE PREFERRED EMBODIMENT

Figure 1:
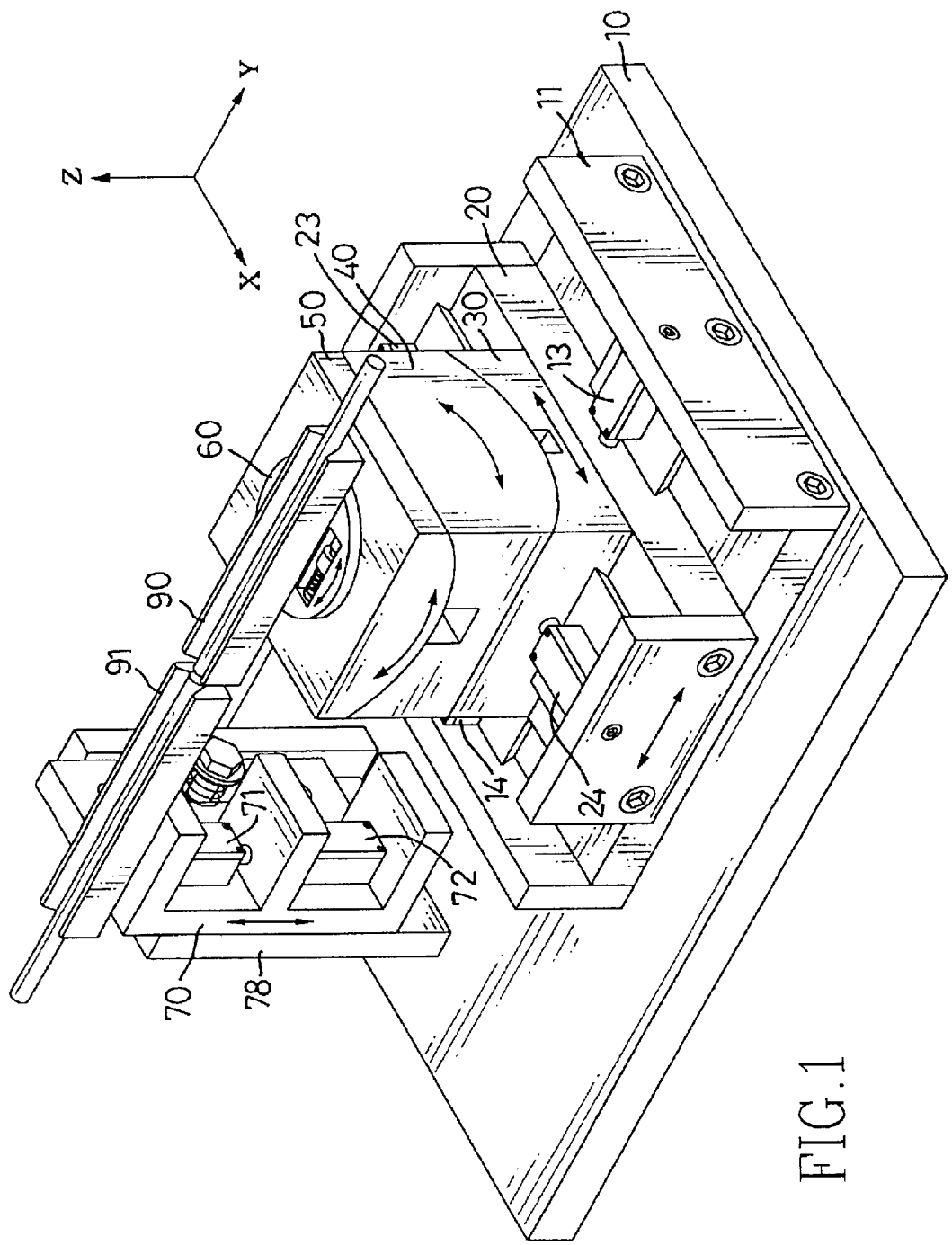
FIG. 1 is a perspective view of a first embodiment of a multi-DOF of positioning device using spring-mounted electromechanical actuators in accordance with the present invention.

With reference to FIG. 1, a multi-DOF positioning device in accordance with the present invention comprises a main base (10), a fixed base (11), a translational Y-axial element (20), a translational X-axial element (30), a rotational angle-adjusting assembly, an elevating device (70) along Z-axis, multiple spring-mounted electromechanical actuating units (13, 14, 23, 24, 71, 72) and two optical fiber holders (90, 91).

Figure 2:
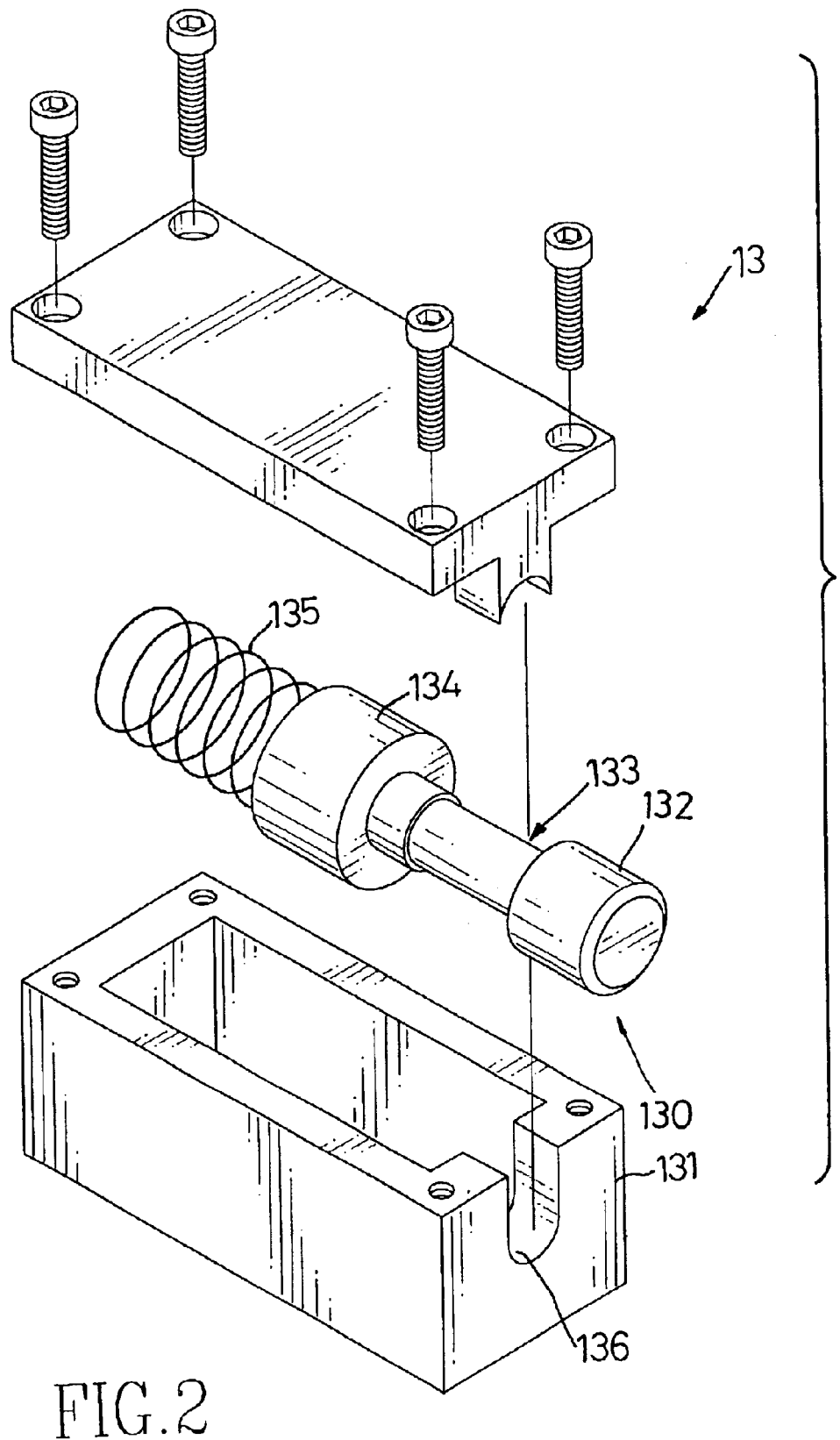
FIG. 2 is an exploded perspective view of a spring-mounted electromechanical actuating unit of the multi-DOF of positioning device in FIG. 1.

The spring-mounted electromechanical actuating units (13, 14, 23, 24, 71, 72) are respectively mounted on the fixed base (11), the translational Y-axial element (20) and the elevating device (70). With reference to FIGS. 1 and 2, the spring-mounted electromechanical actuating units have a same structure and each comprises a housing (131) having a groove (136), a cover (not numbered) and a spring-mounted piezoelectric actuator (130). The spring-mounted piezoelectric actuator (130) comprises a compression spring (135), an inertial body (134), a piezoelectric actuator (133) and a striking head (132). The cover is placed on the top of the housing and is attached to the housing (131) through screws (not numbered). The spring-mounted piezoelectric actuator (130) is mounted inside the housing (131), and the striking head (132) is guided by the groove (136). The piezoelectric actuator (133) is connected to an external controllable voltage source (not numbered) for actuation. The inertial body (134) is attached to the piezoelectric actuator (133), and the compression spring (135) is mounted between the inertial body (134) and the inner surface of the housing (131).

With reference to FIGS. 1 and 2, there are six spring-mounted electromechanical actuating units (13, 14, 23, 24, 71, 72) used for carrying out the translational motions along the X-, Y-, and Z-Axis of the positioning device, and there are also totally six spring-mounted piezoelectric actuators (130) mounted inside the three angle-adjusting elements (40, 50, 60) for carrying out the rotational motions with respect to the X-, Y-, and Z-Axis of the positioning device. Each spring-mounted piezoelectric actuator (130) is set into the positioning device in the way that the striking head (132) is always in contact with the translational or rotational element by initially compressing the spring (135).

Figure 12:
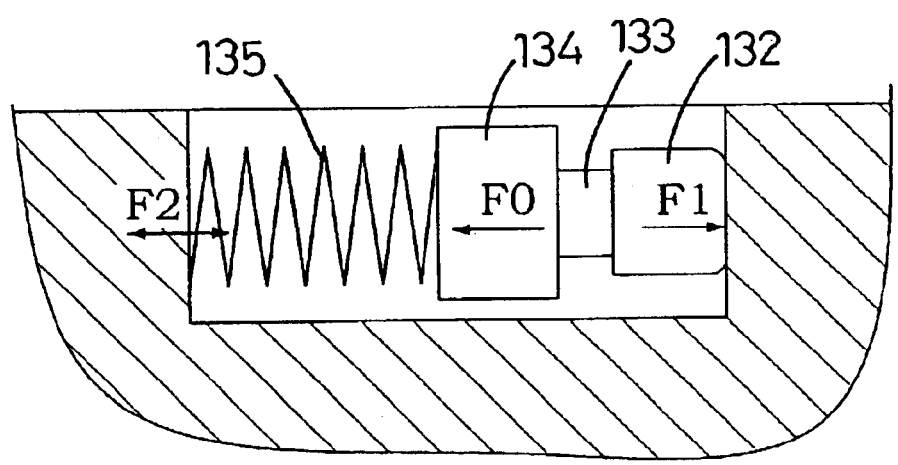
FIG. 12 is a sectional view of an actuated spring-mounted piezoelectric actuator mounted inside the element.

With reference to FIGS. 12 and 13, when a pulse voltage waveform as shown in FIG. 13(a) is applied to the piezoelectric actuator (133), the piezoelectric actuator will expand rapidly and therefore result in the forward and backward impulsive forces acting toward both sides of the piezoelectric actuator (13) with a same magnitude but in opposite direction. The forward impulsive force F1 shown in FIG. 12 pushes the striking head (132) forward and then actuates the translational or rotational element to move with precise motion. Meanwhile, the backward impulsive force F0 as shown in FIG. 12 pushes the inertial body (134) backward, however it will damp down to a smaller force F2 than the forward force F1 due to the function of spring. Since the impulsive forward force F1 as shown in FIG. 13(b) is larger than the vibrated backward force F2 as shown in FIG. 13(c), the actuated element will result in a net forward step-like displacement as shown in FIG. 13(d). With reference to FIG. 13(a), by controlling the amplitude V of the pulse waveform, the step-like displacement of the actuated element can be obtained as large as several micrometers or as small as several nanometers by only one single actuation for the piezoelectric actuator (133). With reference to FIG. 13, when a pulse voltage waveform is continually applied to the piezoelectric actuator, the translational or rotational element will therefore be actuated to move continually and thus with large-stroke ability.

Figure 3:
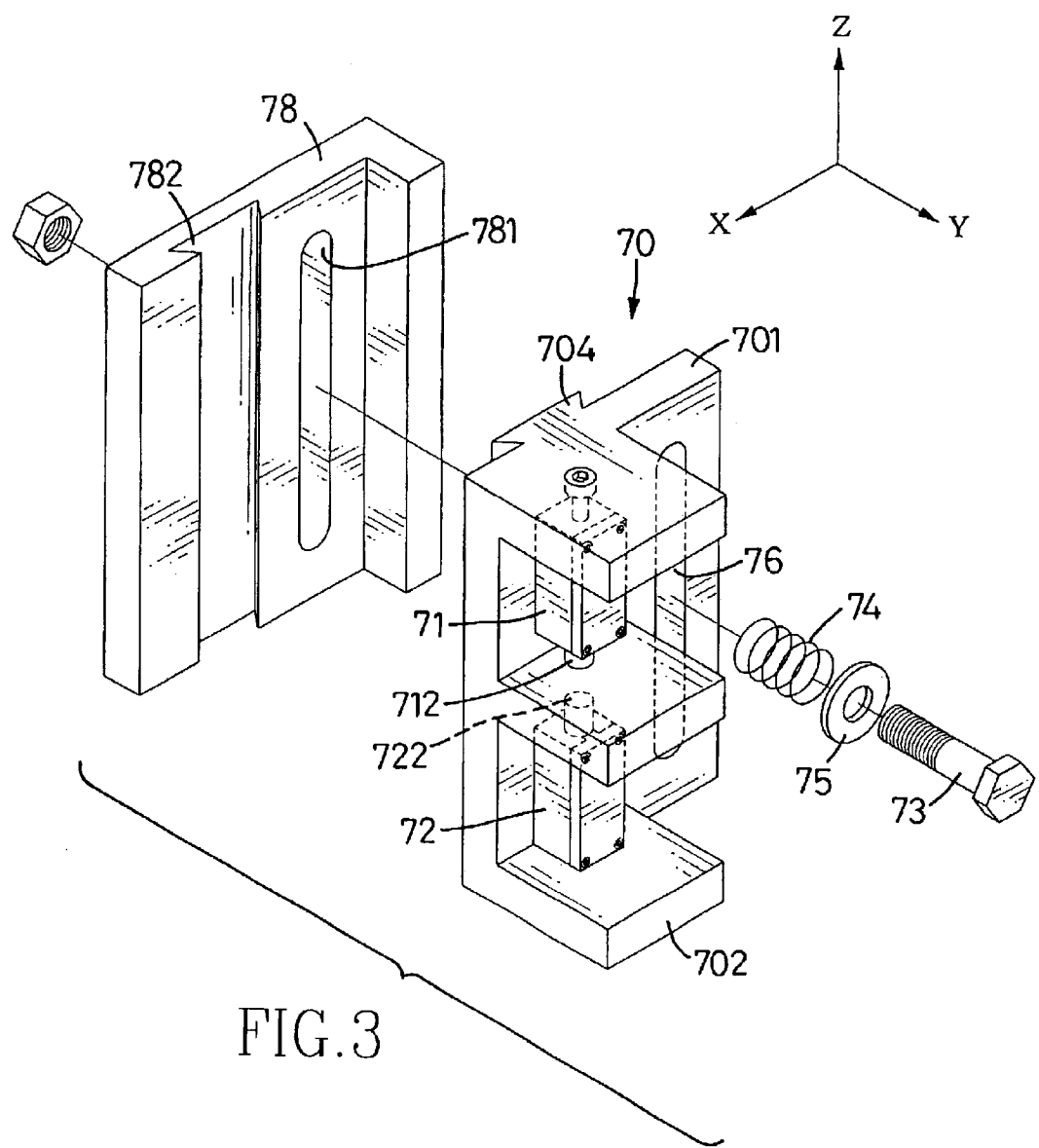
FIG. 3 is a partial exploded perspective view of an elevating device of the multi-DOF of positioning device in FIG. 1.

With reference to FIGS. 1 and 3, the elevating device (70) comprises a mounting plate (78), an elevating element (701), one pair of spring-mounted electromechanical actuating units (71, 72) and a spring-type friction adjusting mechanism (not numbered). The mounting plate (78) has a mounting slot (781) and is fixed to the base (10). The optic fiber holder (91) is securely mounted on the topside of the elevating base (701). The elevating element (701) has a longitudinal slot (76) corresponding to the mounting slot (781) in the mounting plate (78). The elevating element (701) is slidably attached to the mounting plate (78) through the spring-type friction adjusting mechanism. The spring-type friction adjusting mechanism comprises a bolt (73), a washer (75), a compression spring (74) and a nut (not numbered). The bolt (73) extends through the washer (75), the compression spring (74), the longitudinal slot (76) in the elevating element (701) and the mounting slot (781) in the mounting plate (78) and is half-fixed with the nut so as to slidably attach the elevating element (701) to the mounting plate (78). One pair of spring-mounted electromechanical actuating units (71, 72) are symmetrically mounted to the elevating element (701) with keeping the striking heads (712, 722) in contact with a wall (not numbered) formed on the elevating element (701). Based on the configuration, by applying a pulse voltage waveform to one of the actuating units (71, 72), the elevating element (701) will be actuated to move precisely upward or downward along the Z-axis. In addition, two flanges (702) are respectively formed on two ends of the elevating element (701), and the actuating units (71,72) are respectively attached to the flanges (702). A dovetail groove (782) is defined in the mounting plate (78), and a dovetail block (704) is formed on the elevating element and engages with dovetail groove (782) in the mounting plate (78). With the engagement between the dovetail block (704) and the dovetail groove (782), the movement of the elevating element (701) relative to the mounting plate (78) is precisely defined.

Figure 4:
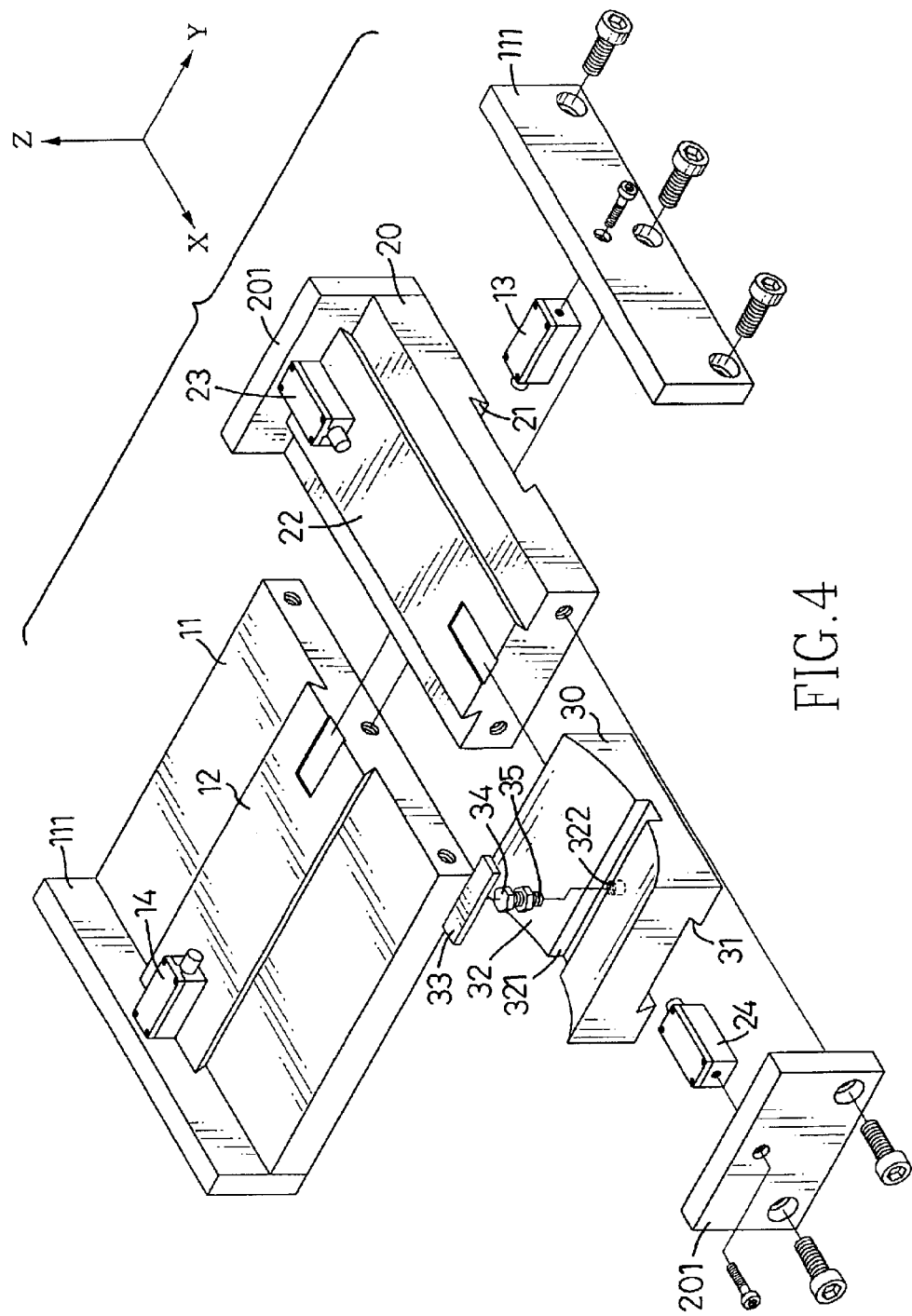
FIG. 4 is a partial exploded perspective view of a base, two translational X- and Y-axial elements of the multi-DOF of positioning device in FIG. 1.

With reference to FIGS. 1 and 4, the fixed base (11) is secured to the main base (10) and comprises a top surface (not numbered) with a dovetail block (12), two mounting sides (not numbered) for mounting two mounting plates (111) and two grooves (not numbered) defined near the mounting plates (111) for setting two actuating units (13, 14).

The translational Y-axial element (20) comprises a top surface with a dovetail block (22), a dovetail groove (21), two mounting sides (not numbered) for two mounting plates (201) and two grooves (not numbered) for setting two actuating units (23, 24). The dovetail groove (21) is defined in the bottom of the translational Y-axial element (20) and engages with the dovetail block (12) on the fixed base (11). The dovetail block (22) on the translational Y-axial element (20) is perpendicular to the dovetail block (12) on the fixed base (11).

Two actuating units (13, 14) are respectively fixed to the mounting plates (111) with the striking heads contacting with the translational Y-axial element (20). Therefore, by applying a pulse voltage waveform to one of the actuating units (13, 14), the translational Y-axial element (20) will be actuated to move precisely forward or backward along the Y-axis.

The translational X-axial element (30) comprises a concave circular surface (32) with respect to Y-axis, a dovetail groove (31), a groove (321) with a threaded hole (322) for fixing a magnet-type friction adjusting mechanism (not numbered). The dovetail groove (31) engages with the dovetail block (22) on the translational Y-axial element (20) so as to slidably mount the translational X-axial element (30) to the translational Y-axial element (20). The magnet-type friction adjusting mechanism comprises a magnet (33) and a threaded stub (35) with a head (34). The threaded stub (35) is screwed into the threaded hole (322) in the translational X-axial element (30), and the magnet (33) is attracted to the head (34) on the threaded stub (35) and is received in the groove (321) in the translational X-axial element (30).

Two actuating units (23, 24) are respectively fixed to the mounting plates (201) with the striking heads contacting with the translational X-axial element (30). Therefore, by applying a pulse voltage waveform to one of the actuating units (23, 24), the translational X-axial element (30) will be actuated to move precisely forward or backward along the X-axis.

Figure 5:
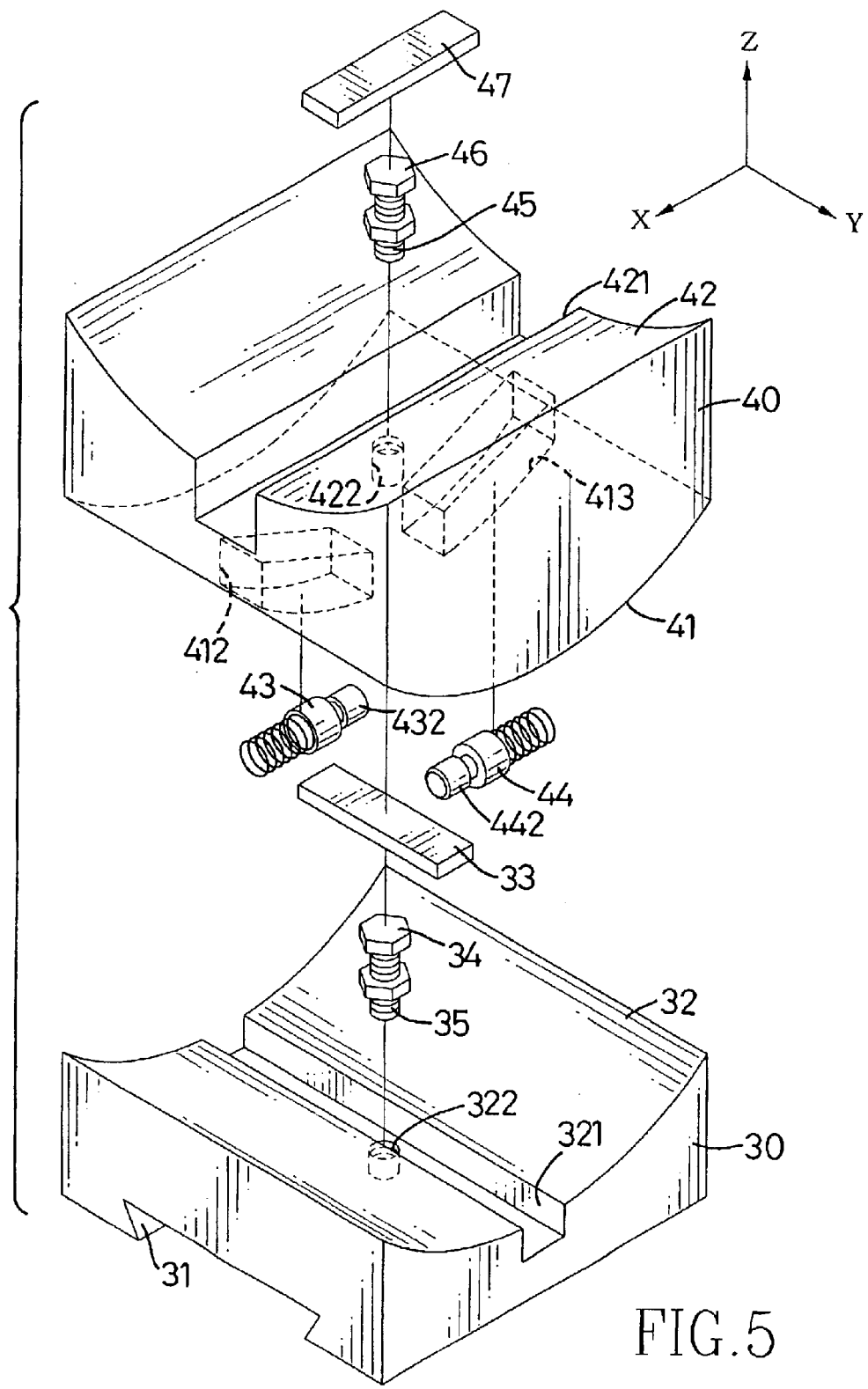
FIG. 5 is an exploded perspective view of a translational X-axial element, and a rotational angle-adjusting element with respect to Y-axis of the multi-DOF of positioning device in FIG. 1.

In the first embodiment, with reference to FIG. 1, the rotational angle-adjusting assembly comprises a Y-axis rotational angle-adjusting element (40), an X-axis rotational angle-adjusting element (50) and a Z-axis rotational angle-adjusting element (60). With reference to FIG. 5, the Y-axis rotational angle-adjusting element (40) comprises a concave circular surface (42) with respect to X-axis, a convex circular surface (41), two recesses (412, 413), two spring-mounted piezoelectric actuators (43, 44), a groove (421) and a magnet-type friction adjusting mechanism (not numbered). The concave circular surface (42) is defined in the top of the Y-axis rotational angle-adjusting element (40), and the convex circular surface (41) is formed on the bottom of the Y-axis rotational angle-adjusting element (40) and corresponds to the concave circular surface (32) in the translational X-axial element (30). The recesses (412, 413) are defined in the convex circular surface (41) for respectively allocating the two spring-mounted piezoelectric actuators (43, 44). Each spring-mounted piezoelectric actuator (43, 44) has a structure same as the structure of the spring-mounted electromechanical actuating units (13,14,23,24,71, 72) except that the spring-mounted piezoelectric actuator (43, 44) has not a housing and a cover. The groove (421) is defined in the concave circular surface (42) and has a threaded hole (422) for fixing the magnet-type friction adjusting mechanism (not numbered). The magnet-type friction adjusting mechanism (not numbered) comprises a magnet (47) and a threaded stub (45) with a head (46). The threaded stub (45) is screwed into the threaded hole (422) in the Y-axis rotational angle-adjusting element (40), and the magnet (47) is attracted to the head (46) on the threaded stub (45) and is received in the groove (421) in the Y-axis rotational angle-adjusting element (40).

The Y-axis rotational angle-adjusting element (40) is placed on the translational X-axial element (30). The recesses (412, 413) are defined in the convex circular surface (41), and the two piezoelectric actuators (43, 44) are respectively mounted in the recesses (412, 413) with the striking heads (432, 442) facing to each other and contacting with the rotational angle-adjusting element (40). Each of the two piezoelectric actuators (43, 44) is mounted in the way that the actuating direction of the actuator (43,44) is perpendicular to the line (not numbered) formed by the actuating point and the origin of the convex circular surface (41) viewed from the Y-axis. Therefore, by applying a pulse voltage waveform to one of the two piezoelectric actuators (43, 44), the angle-adjusting element (40) will be actuated to rotate precisely clockwise or counterclockwise with respect to Y-axis. By suitably adjusting the elevation of the magnet (33), an attractive force between the magnet and the convex circular surface (41) is obtained. Accordingly, a suitable friction force between the convex and concave circular surfaces (32, 41) is obtained for preventing the angle-adjusting element (40) from slipping after the actuation is terminated.

Figure 6:
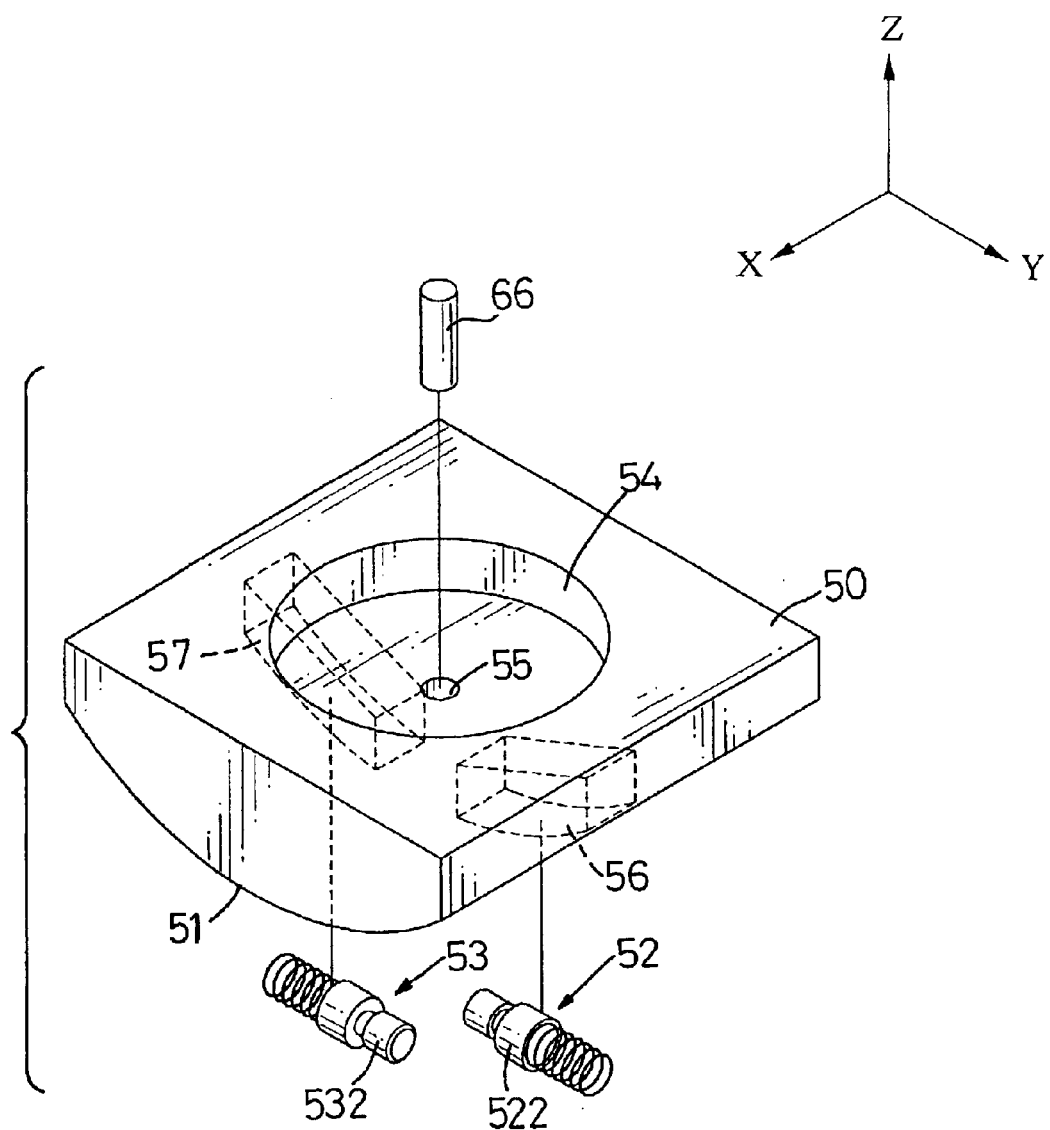
FIG. 6 is an exploded perspective view of a rotational angle-adjusting element with respect to Y-axis of the multi-DOF of positioning device in FIG. 1.

With reference to FIGS. 5 and 6, the X-axis rotational angle-adjusting element (50) comprises a convex circular surface (51), two recesses (56, 57), two spring-mounted piezoelectric actuators (52, 53), a circular top recess (54), a shaft (66) and a shaft hole (55). The convex circular surface (51) is formed on the bottom of the X-axis rotational angle-adjusting element (50) and corresponds to the concave circular surface (42) in the Y-axis rotational angle-adjusting element (40). The two recesses (56, 57) are defined in the convex circular surface (56), and the piezoelectric actuators (52, 53) are respectively mounted in the recesses (56, 57) with the striking heads (522, 532) facing to each other and contacting with the rotational angle-adjusting element (50). Wherein, each spring-mounted piezoelectric actuator (52, 53) has a structure same as the structure of the spring-mounted electromechanical actuating units (13,14,23,24,71, 72) except that the spring-mounted piezoelectric actuator (52, 53) has not a housing and a cover. Each of the two piezoelectric actuators (53, 54) is mounted in the way that the actuating direction of the actuator (53,54) is perpendicular to the line (not numbered) formed by the actuating point and the origin of the convex circular surface (41) viewed from X-axis. Therefore, by applying a pulse voltage waveform to one of the two piezoelectric actuators (52, 53), the angle-adjusting element (50) will be actuated to rotate precisely clockwise or counterclockwise with respect to X-axis. The magnet-type friction adjusting mechanism on the Y-axis rotational angle-adjusting element (40) is used to adjust a suitable friction force between the convex and concave circular surfaces (42, 51) for preventing the angle-adjusting element (50) from slipping after the actuation is terminated.

Figure 7:
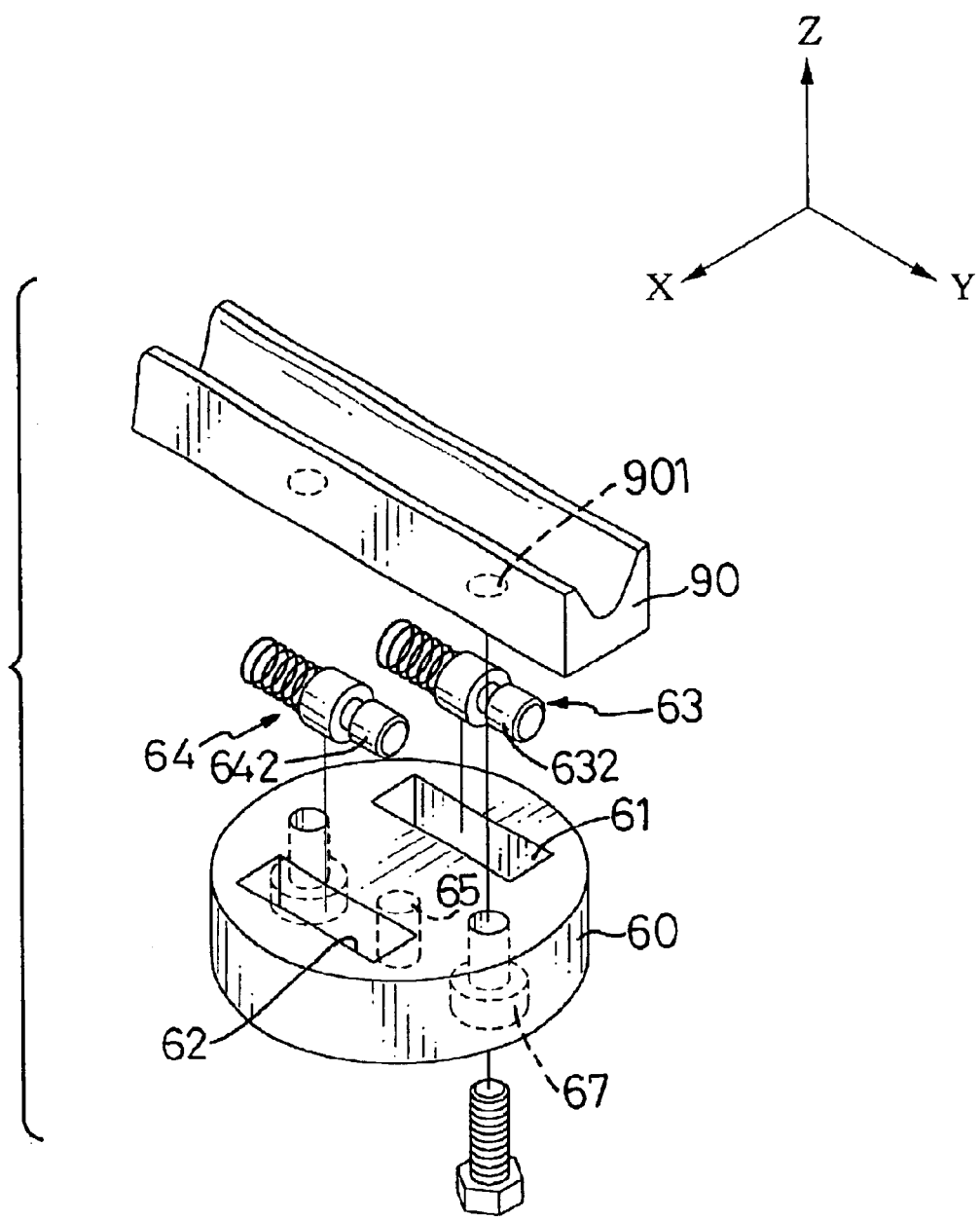
FIG. 7 is an exploded perspective view of a rotational angle-adjusting element with respect to Z-axis and an optic fiber holder of the multi-DOF of positioning device in FIG. 1.

With reference to FIGS. 6 and 7, the Z-axis rotational angle-adjusting element (60) comprises a circular disc, two recesses (61, 62), two bolts (not numbered), two screw holes (67), two spring-mounted piezoelectric actuators (63, 64) and a shaft hole (65). The circular disc has a center (not numbered), a top surface (not numbered) and a bottom surface (not numbered).

Two recesses (61, 62) are defined in a same direction on the top surface of the angle-adjusting element (60), and the two spring-mounted piezoelectric actuators (63, 64) are respectively mounted into the two recesses (61, 62) with the striking heads (632, 642) contacting with the rotational angle-adjusting element (60). Wherein, each spring-mounted piezoelectric actuator (63, 64) has a structure same as the structure of the spring-mounted electromechanical actuating units (13,14,23,24,71,72) except that the spring-mounted piezoelectric actuator (63,64) has not a housing and a cover. The angle-adjusting element (60) is fit to the shaft (66), which is securely fixed to shaft hole (55) of the X-axis angle-adjusting element (50). Therefore, by applying a pulse voltage waveform to one of the two piezoelectric actuators (63, 64), the angle-adjusting element (50) will be actuated to rotate precisely clockwise or counterclockwise with respect to Z-axis.

The optic fiber holder (90) is fixed to angle-adjusting element (60) by bolts extending through holes (67) in the element (60) and being screwed into screw holes (901) in the holder (90).

Based on the above-mentioned detail descriptions, the positioning device shown in FIG. 1 can perform the positioning works with 6-DOF, which are the translational motions along X-, Y-, and Z-axis, and the rotational motions with respect to X-, Y-, and Z-axis. For example, it is supposed to one of the applications in which when two filaments of optic fibers (92) are respectively placed on the optic fiber holders (90, 91) and are aimed to be connected with each other, the multi-DOF positioning device can align the two optic fibers with the best position accuracy. Because of the optic fibers are as small as several micrometers, the required accuracy for the alignment works is as high as sub-micron or even several ten nanometers. In the alignment process for the optic fibers, a power meter (not shown) is commonly used to detect the performance of the output light intensity. A control algorithm implemented in a computer (not shown) will select which actuating direction is carried out until the output of the power meter meets the requirement. It is apparent that the present invention with the advantages of high-precision positioning ability and large operational range can provide an effective means in the alignment works for the precision components.

Figure 8:
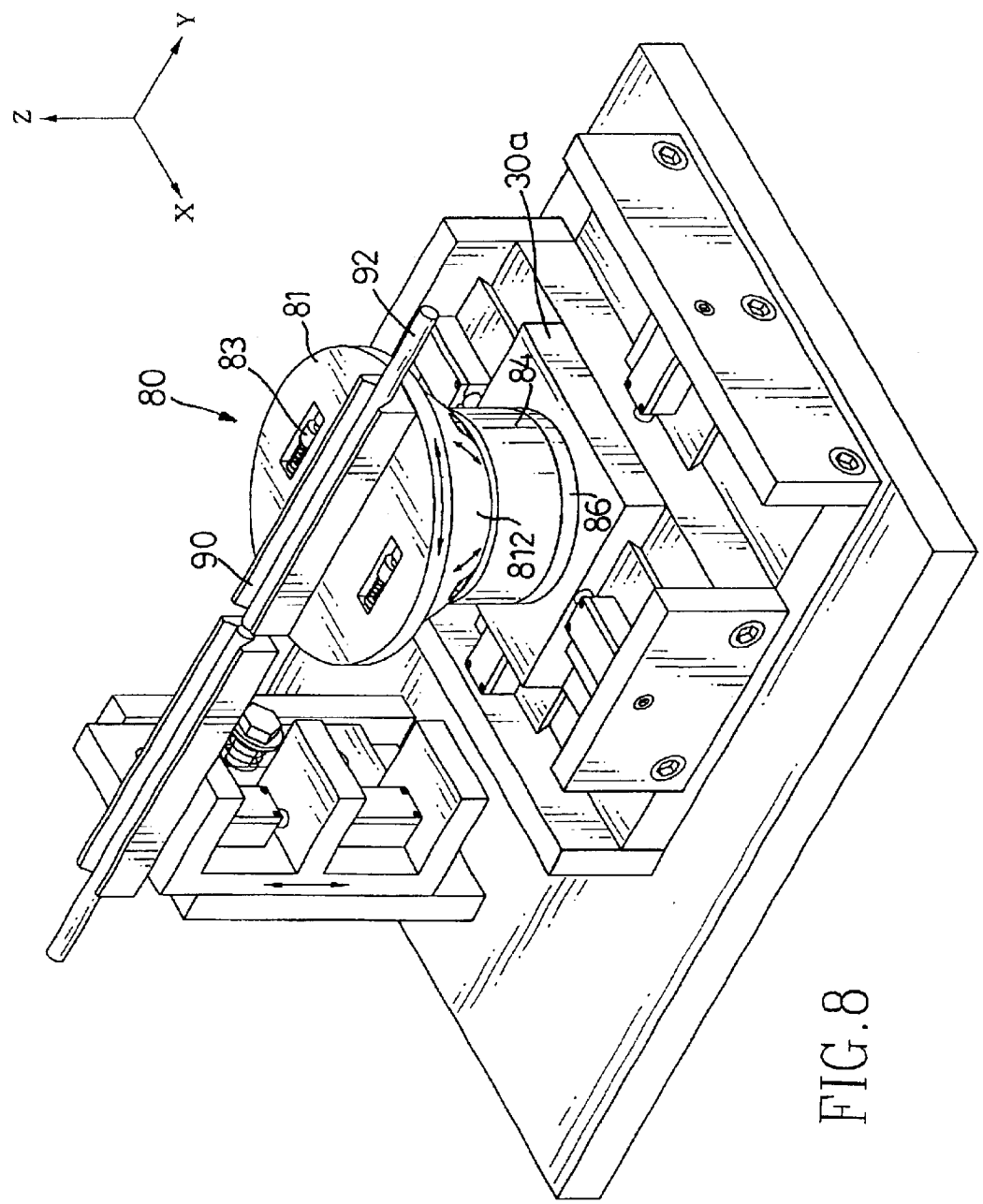
FIG. 8 is a perspective view of a second embodiment of a multi-DOF of positioning device in accordance with the present invention.
Figure 9:
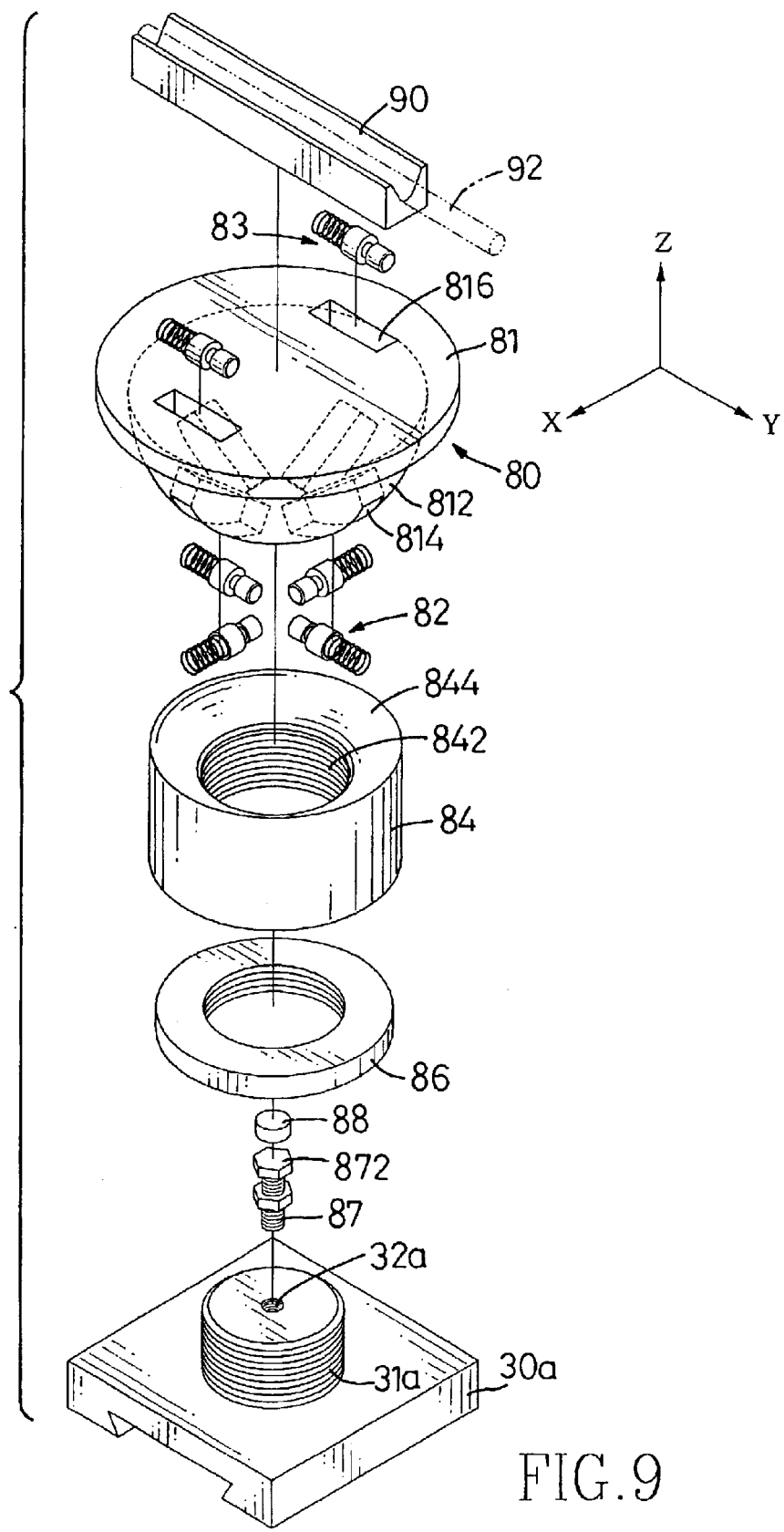
FIG. 9 is a partial exploded perspective view of a universal angle-adjusting mechanism of the multi-DOF of positioning device in FIG. 8.

With reference to FIGS. 8 to 9, the second embodiment of the multi-DOF of positioning device is exactly same as the first embodiment except that the above-mentioned angle-adjusting elements (40, 50, 60) shown in FIG. 1 are now replaced by a universal angle-adjusting sphere assembly (80) and the concave circular surface of the translational X-axial element (30) is replaced by and a translational X-axial element (30a) having a flat surface with a threaded stub (31a). The universal angle-adjusting sphere assembly (80) comprises a universal angle-adjusting sphere (81), six spring-mounted piezoelectric actuators (82,83), a sphere base (84) and a locking plate (86). The universal angle-adjusting sphere (81) comprises a sphere-shape surface (812) on the bottom, a flat surface on the top, two top recesses (816) and four bottom recesses (814). The top recesses (816) are defined in the flat surface on the top, and the bottom recesses (814) are defined in the sphere-shape surface (812). The spring-mounted piezoelectric actuators (82,83) are respectively mounted in the top recesses (816) and the bottom recesses (814). Each spring-mounted piezoelectric actuator (82,83) has a structure same as the structure of the spring-mounted electromechanical actuating units (13,14,23,24,71,72) except that the spring-mounted piezoelectric actuator (82,83) has not a housing and a cover.

The translational X-axial element (30a) comprises a threaded base (31a) with a screw hole (32a), a dovetail groove for mounting to the translational Y-axial element (20) as shown in FIG. 4 and a magnet-type friction adjusting mechanism (not numbered). The magnet-type friction adjusting mechanism comprises a magnet (88) and a threaded stub (87) with a head (872). The threaded base (31a) is securely mounted on the top of the translational X-axial element (30a). The threaded stub (87) of the magnet-type friction adjusting mechanism is screwed into the screw hole (32a) in the threaded base (31a). The magnet (88) is attracted to the head (872) on the threaded stub (87) and to the sphere-shape surface (812).

The sphere base (84) comprising a concave surface (844) corresponding to the sphere-shape surface (812) and an inner thread (842) screwed onto the threaded base (31a). The lock-plate (86) has a threaded central hole (not numbered) screwed onto the threaded base (31a) and is mounted below the sphere base (84). The universal angle-adjusting sphere (81) is placed on the concave sphere-shape surface (844) in the sphere base (84), so it is rotational in any direction. One pair of spring-mounted piezoelectric actuators (83) are internally set into the two recesses (816) in the top surface (81) with a same direction for carrying out the rotational motions with respect to Z-axis. Two pairs of spring-mounted piezoelectric actuators (82) are respectively set into the recesses (814) in the sphere-shape surface (812) for carrying out the rotational motions with respect to X-, and Y-axis.

The magnet-type friction adjusting mechanism is used for obtaining a suitable friction force between the sphere surfaces (812, 844) and preventing the universal angle-adjusting sphere (81) from slipping when the actuation is terminated.

With reference to FIGS. 10 and 11, a third embodiment of the multi-DOF of positioning device in accordance with the present invention comprises a main base (10a), a fixed base (11), a translational Y-axial element (20), a translational X-axial element (30), a Y-axis rotational angle-adjusting element (40), an X-axis rotational angle-adjusting element (50), a Z-axis rotational angle-adjusting element (60), an elevating device (70C), multiple spring-mounted electromechanical actuating units (13, 14, 23, 24, 71C, 72C) and two optical fiber holders (90, 91). Wherein, structures of the fixed base (11), the translational Y-axial element (20), the translational X-axial element (30), the Y-axis rotational angle-adjusting element (40), the X-axis rotational angle-adjusting element (50), the Z-axis rotational angle-adjusting element (60), the spring-mounted electromechanical actuating units (13, 14, 23, 24, 71C, 72C) and one of the optical fiber holders (90) are same as those of the first embodiment shown in FIGS. 1 to 7 and are not further described. The other optic fiber holder (91) is securely mounted on a stationary base (not shown) and corresponds to the optic fiber holder (90).

The elevating device (70C) comprises a hold body (78) and an elevating body (77). The hold body (78) is mounted on the main base (10a) and comprises a slanted recess (781) defined in the top of the hold body (78). Two recesses (not numbered) are defined in the bottom of the hold body (78), and two spring-mounted electromechanical actuating units (71C, 72C) are respectively mounted in the recesses with the striking heads aligning with each other and contacting with the hold body (78). The spring-mounted electromechanical actuating units (71C,72C) has a structure same as the structure of the spring-mounted electromechanical actuating units (13,14,23,24) except that the spring-mounted piezoelectric actuator (71C,72C) has not a housing and a cover.

The elevating body (77) is slidably mounted on the top of the hold body (78) and abuts against a mounting bracket (1012) mounted on the main base (10a). In practice, a dovetail recess (not numbered) and a dovetail block (not numbered) are respectively formed on the elevating body (77) and the mounting bracket (1012) and engage with each other. The elevating body (77) comprises a top (not numbered) and a slanted bottom (not numbered). The slanted bottom of the elevating body (77) is slideably mounted in the slanted recess (781), and the fixed base (11) is mounted on the top of the elevating body (77).

By applying a pulse voltage waveform to one of the actuating units (71C, 72C), the hold body (78) will be actuated to move precisely forward or backward. With the movement of the hold body (78), the elevating body (77) will move upward or downward along the Z-axis due to the engagement between the slanted bottom on the elevating body (77) and the slated recess in the hold body (78). In addition, with the engagement between the dovetail block and the dovetail groove between the elevating body (77) and the mounting bracket (1012), the movement of the elevating body (77) relative to the hold body (78) is smooth.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A multi-DOF (degree-of-freedom) of positioning device for alignment a first optic fiber that is supported on a first optical fiber holder with a second optic fiber, and the multi-DOF (degree-of-freedom) of positioning device comprising:

a main base;

a fixed base connected to the main base;

a translational Y-axial element moveably mounted on the fixed base along a first axis;

a translational X-axial element moveably mounted on the translational Y-axial element along a second axis perpendicular to the first axis;

two first spring-mounted electromechanical actuating units mounted on the fixed base to make the translational Y-axial element move relative to the fixed base along the first axis;

two second spring-mounted electromechanical actuating units mounted on the translational Y-axial element to make the translational X-axial element move relative to the translational Y-axial element along the second axis;

an elevating device moveably mounted on the main base along a third axis perpendicular to the first and the second axes;

two third spring-mounted electromechanical actuating units mounted on the elevating device to move the elevating device relative to the main base along the third axis;

a rotational angle-adjusting assembly mounted on the translational X-axial element and having a capability of rotating relative to the first, the second and the third axes; and a second optical fiber holder attached to the rotational angle-adjusting assembly and adapted to support the second optic fiber to align with the first optic fiber.

2. The multi-DOF of positioning device claimed in claim 1, wherein the rotational angle-adjusting assembly comprises a Y-axis rotational angle-adjusting element mounted on the translational X-axial element and having a capability of rotating relative to the translational X-axial element along the first axis;

an X-axis rotational angle-adjusting element mounted on the Y-axis rotational angle-adjusting element and having a capability of rotating relative to the Y-axis rotational angle-adjusting element along the second axis; and a Z-axis rotational angle-adjusting element mounted on the X-axis rotational angle-adjusting element and having a capability of rotating relative to the X-axis rotational angle-adjusting element along the third axis.

3. The multi-DOF of positioning device claimed in claim 2, wherein the X-axis rotational angle-adjusting element has a top;

a circular top recess with a bottom defined in the top;

a shaft hole defined in the bottom of the circular top recess; and a shaft inserted into the shaft hole;

the Z-axis rotational angle-adjusting element comprises a top;

a bottom;

a bottom shaft hole defined in the bottom of the Z-axis rotational angle-adjusting element and receiving the shaft inserted in the shaft hole in the X-axis rotational angle-adjusting element;

two recesses defined in the top of the Z-axis rotational angle-adjusting element and each having an inner surface; and two third spring-mounted piezoelectric actuators respectively received in the recesses and each third spring-mounted piezoelectric actuator comprising an inertial body received in one of the recesses;

a compression spring mounted between the inertial body and the inner surface of the recess in which the third spring-mounted piezoelectric actuator is received;

a piezoelectric actuator connected to the inertial body and adapted to be connected to an external controllable voltage source; and a striking head connected to the piezoelectric actuator and contacting with the inner surface of the recess in which the third spring-mounted piezoelectric actuator is received; and the second optic fiber holder is fixed to the top of the Z-axis angle-adjusting element.

4. The multi-DOF of positioning device claimed in claim 3, wherein multiple through holes are defined through the Z-axis angle-adjusting element;

a screw hole is defined in the second optic fiber holder and corresponds to each respectively through hole in the Z-axis angle-adjusting element; and a bolt extends through each respective through hole in the Z-axis angle-adjustment element and screwed into a corresponding one of the screw holes in the second topical fiber holder.

5. The multi-DOF of positioning device claimed in claim 2, wherein the translational X-axial element has a top;

a concave circular surface defined in the top with respect to the first axis;

a groove with a bottom defined in the concave circular surface along the first axis;

a threaded hole defined in the bottom of the groove; and a magnet-type friction adjusting mechanism mounted on the threaded hole and comprising a threaded stub with a head screwed into the threaded hole; and a magnet attracted to the head on the threaded stub and received in the groove in the translational X-axial element; and the Y-axis rotational angle-adjusting element comprises a bottom;

a convex circular surface formed on the bottom, corresponding to and received in the concave circular surface in the translational X-axial element and attracted with the magnet of the magnet-type friction adjusting mechanism;

two recesses defined in the convex circular surface and each having an inner surface;

two first spring-mounted piezoelectric actuators respectively received in the recesses and each first spring-mounted piezoelectric actuator comprising an inertial body received in one of the recesses;

a compression spring mounted between the inertial body and the inner surface of the recess in which the first spring-mounted piezoelectric actuator is received;

a piezoelectric actuator connected to the inertial body and adapted to be connected to an external controllable voltage source; and a striking head connected to the piezoelectric actuator and contacting with the inner surface of the recess in which the first spring-mounted piezoelectric actuator is received.

6. The multi-DOF of positioning device claimed in claim 2, wherein the Y-axis rotational angle-adjusting element has a top;

a concave circular surface defined in the top with respect to the second axis;

a groove with a bottom defined in the concave circular surface along the second axis;

a threaded hole defined in the bottom of the groove; and a magnet-type friction adjusting mechanism mounted on the threaded hole and comprising a threaded stub with a head screwed into the threaded hole; and a magnet attracted to the head on the threaded stub and received in the groove in the Y-axis rotational angle-adjusting element; and the X-axis rotational angle-adjusting element comprises a bottom;

a convex circular surface formed on the bottom, corresponding to and received in the concave circular surface in the Y-axis rotational angle-adjusting element and attracted with the magnet of the magnet-type friction adjusting mechanism;

two recesses defined in the convex circular surface and each having an inner surface;

two second spring-mounted piezoelectric actuators respectively received in the recesses and each second spring-mounted piezoelectric actuator comprising an inertial body received in one of the recesses;

a compression spring mounted between the inertial body and the inner surface of the recess in which the second spring-mounted piezoelectric actuator is received;

a piezoelectric actuator connected to the inertial body and adapted to be connected to an external controllable voltage source; and a striking head connected to the piezoelectric actuator and contacting with the inner surface of the recess in which the second spring-mounted piezoelectric actuator is received.

7. The multi-DOF of positioning device claimed in claim 1, wherein the elevating device comprises a mounting plate securely attached to the main base and adapted for the first topical fiber holder being mounted on the mounting plate;

an elevating element moveably attached to the mounting plate along the third axis; and a spring-type friction adjusting mechanism mounted between the elevating element and the mounting plate to moveably attach the elevating element to the mounting plate; and the third spring-mounted electromechanical actuating units are symmetrically mounted on the elevating element and each third spring-mounted electromechanical actuating unit comprises a housing securely attached to the elevating element and having an inner surface and a groove defined in one end of the housing;

a cover attached to the housing; and a spring-mounted piezoelectric actuator operationally mounted in the housing and comprising an inertial body;

a compression spring mounted between the inertial body and the inner surface of the housing;

a piezoelectric actuator connected to the inertial body and adapted to be connected to an external controllable voltage source; and a striking head connected to the piezoelectric actuator, exposed from the housing from the groove and contacting with the elevating element.

8. The multi-DOF of positioning device claimed in claim 7, wherein the mounting plate has a mounting slot defined along the third axis;

the elevating element has a longitudinal slot defined along the axis third and corresponding to the mounting slot in the mounting plate; and the spring-type friction adjusting mechanism comprises
a bolt extending through the longitudinal slot in the elevating element and the mounting slot in the mounting plate;
a washer mounted around the bolt;
a compression spring mounted around the bolt and between the washer and the elevating element; and
a nut screwed with the bolt.

9. The multi-DOF of positioning device claimed in claim 8, wherein a dovetail groove is defined in the mounting plate along the third axis; and
a dovetail block is formed on the elevating element and engages with dovetail groove in the mounting plate.

10. The multi-DOF of positioning device claimed in claim 7, wherein the elevating element has a wall formed on the elevating element and contacting with the striking heads of the third spring-mounted electromechanical actuating units.

11. The multi-DOF of positioning device claimed in claim 1, wherein the translational X-axial element has a top and a threaded base formed on the top of the translational X-axial element;

the rotational angle-adjusting assembly is a universal angle-adjusting sphere assembly and comprises
a universal angle-adjusting sphere having
a top;
a bottom;
a sphere-shape surface formed on the bottom;
a flat surface formed on the top; and
two top recesses defined in the top, parallel to each other and each having an inner surface;
four bottom recesses defined in the sphere-shape surface and each having an inner surface;
a sphere base screwed onto the threaded base on the translational X-axial element and having
a top;
a concave surface defined in the top and corresponding to the sphere-shape surface on the universal angle-adjusting sphere; and
an inner thread defined through the sphere base and screwed onto the threaded base; and
six spring-mounted piezoelectric actuators respectively received in the top recesses and the bottom recesses in the universal angle-adjusting sphere, and each spring-mounted piezoelectric actuator comprising
an inertial body received in a corresponding one of the top recesses and the bottom recesses;
a compression spring mounted between the inertial body and the inner surface of the corresponding recess in which the spring-mounted piezoelectric actuator is received;
a piezoelectric actuator connected to the inertial body and adapted to be connected to an external controllable voltage source; and
a striking head connected to the piezoelectric actuator and contacting with the inner surface of the corresponding recess in which the spring-mounted piezoelectric actuator is received; and
the second topical fiber holder is secured to the flat surface on the universal angle-adjusting sphere.

12. The multi-DOF of positioning device claimed in claim 11, wherein the rotational angle-adjusting assembly further has a locking plate screwed onto the threaded base on the translational X-axial element.

13. The multi-DOF of positioning device claimed in claim 11, wherein a screw hole is defined in the threaded base on the translational X-axial element; and a magnet-type friction adjusting mechanism is mounted on the threaded base and comprises
a threaded stub with a head screwed into the screw hole in the threaded hole in the translational X-axial element; and
a magnet attracted to the head on the threaded stub and to the sphere-shape surface on the universal angle-adjusting sphere.

14. The multi-DOF of positioning device claimed in claim 1, wherein the main base has a mounting bracket;
the elevating device comprises
a hold body mounted on the main base and having
a top;
a bottom;
a slanted recess defined in the top of the hold body; and
two recesses defined in the bottom of the hold body; and
an elevating body slidably mounted on the top of the hold body, abutting against the mounting bracket on the main base and having
a top;
a bottom; and
a slanted bottom formed on the bottom of the elevating body and slideably mounted in the slanted recess;
the third spring-mounted electromechanical actuating units are respectively mounted in the recesses in the hold body and each third spring-mounted electromechanical actuating unit comprises
an inertial body received in a corresponding one of the recesses;
a compression spring mounted between the inertial body and the inner surface of the corresponding recess in which the spring-mounted piezoelectric actuator is received;
a piezoelectric actuator connected to the inertial body and adapted to be connected to an external controllable voltage source; and
a striking head connected to the piezoelectric actuator and contacting with the inner surface of the corresponding recess in which the spring-mounted piezoelectric actuator is received; and
the fixed base is mounted on the top of the elevating body and connected to the main base through the elevating device.

15. The multi-DOF of positioning device claimed in claim 14, wherein a dovetail recess is defined in the elevating body; and
a dovetail block is formed on the mounting bracket and engages with the dovetail recess in the elevating body.

16. The multi-DOF of positioning device claimed in claim 14, wherein a dovetail recess is defined in bottom of the hold body; and
a dovetail block is formed on the main base and engages with the dovetail recess in the hold body.

17. The multi-DOF of positioning device claimed in claim 1, wherein the fixed base has
a top surface;
two mounting plates mounted on two sides of the fixed base; and
two grooves defined in the top surface and respectively near the mounting plate for setting the first spring-mounted electromechanical actuating units; and each first spring-mounted electromechanical actuating unit comprises a housing securely attached to one of the grooves in the fixed base and having an inner surface and a groove defined in one end of the housing;

a cover attached to the housing; and a spring-mounted piezoelectric actuator operationally mounted in the housing and comprising an inertial body;

a compression spring mounted between the inertial body and the inner surface of the housing;

a piezoelectric actuator connected to the inertial body and adapted to be connected to an external controllable voltage source; and a striking head connected to the piezoelectric actuator, exposed from the housing from the groove and contacting with the translational Y-axial element.

18. The multi-DOF of positioning device claimed in claim 1, wherein the fixed base has a dovetail block formed on the top surface and along the first axis; and the translational Y-axial element has a bottom and a dovetail groove defined in the bottom and engaging with the dovetail block on the fixed base.

19. The multi-DOF of positioning device claimed in claim 1, wherein the translational Y-axial element has a top surface;

two mounting sides;

two mounting plates respectively mounted on the mounting sides; and two grooves defined in the top surface and respectively defined near the mounting plates for setting the second spring-mounted electromechanical actuating units; and each second spring-mounted electromechanical actuating unit comprises a housing securely attached to one of the grooves in the translational Y-axial element and having an inner surface and a groove defined in one end of the housing;

a cover attached to the housing; and a spring-mounted piezoelectric actuator operationally mounted in the housing and comprising an inertial body;

a compression spring mounted between the inertial body and the inner surface of the housing;

a piezoelectric actuator connected to the inertial body and adapted to be connected to an external controllable voltage source; and a striking head connected to the piezoelectric actuator, exposed from the housing from the groove and contacting with the translational X-axial element.

20. The multi-DOF of positioning device claimed in claim 1, wherein the translational Y-axial element has a dovetail block formed on the top surface and along the second axis; and the translational X-axial element has a bottom and a dovetail groove defined in the bottom and engaging with the dovetail block on the translational Y-axial element.

* * * * *